United States Patent
Shelke et al.

(10) Patent No.: US 11,907,706 B2
(45) Date of Patent: Feb. 20, 2024

(54) SYSTEM AND METHOD OF ANALYZING UPDATE READINESS FOR DISTRIBUTED SOFTWARE SYSTEMS

(71) Applicant: VMware LLC, Palo Alto, CA (US)

(72) Inventors: Prashant Shelke, Maharashtra (IN); Ashish Agrawal, Maharashtra (IN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 17/320,585

(22) Filed: May 14, 2021

(65) Prior Publication Data
US 2022/0365771 A1 Nov. 17, 2022

(51) Int. Cl.
*G06F 8/656* (2018.01)
*G06F 8/61* (2018.01)
*G06F 11/07* (2006.01)
*G06F 9/455* (2018.01)

(52) U.S. Cl.
CPC .............. *G06F 8/656* (2018.02); *G06F 8/61* (2013.01); *G06F 9/45558* (2013.01); *G06F 11/0772* (2013.01); *G06F 11/0793* (2013.01); G06F 2009/45595 (2013.01)

(58) Field of Classification Search
CPC ........ G06F 8/656; G06F 8/61; G06F 9/45558; G06F 2008/45595; G06F 11/0772; G06F 11/0793
See application file for complete search history.

(56) References Cited

U.S. PATENT DOCUMENTS

| | | | | |
|---|---|---|---|---|
| 2008/0276301 A1* | 11/2008 | Nataraj | ...................... | G06F 8/60 726/3 |
| 2009/0328023 A1* | 12/2009 | Bestland | ................... | G06F 8/65 717/168 |
| 2011/0214021 A1* | 9/2011 | Vidal | ........................ | G06F 8/65 714/E11.144 |
| 2011/0225575 A1* | 9/2011 | Ningombam | ............. | G06F 8/65 717/170 |
| 2011/0231838 A1* | 9/2011 | Wookey | .................. | G06F 8/658 717/176 |

(Continued)

*Primary Examiner* — Wei Y Zhen
*Assistant Examiner* — Brahim Bourzik
(74) *Attorney, Agent, or Firm* — King Intellectual Asset Management

(57) ABSTRACT

The disclosure provides for analyzing upgrade and migration readiness. Embodiments include receiving an indication to upgrade a software product and a selected upgrade path identifying a target-upgrade version. Embodiments include accessing an array of pre-upgrade procedures comprising code for identifying one or more conditions that must be met before the software product can be upgraded based on the accessed array being associated with the software product. Embodiments include executing one or more of the pre-upgrade procedures in advance of upgrading the software product. Embodiments include accessing one or more autonomous remediation scripts from the repository based on identification of one or more failed pre-upgrade procedures. Embodiments include executing the one or more autonomous remediation scripts to cure the one or more failed pre-upgrade procedures and initiating an upgrade of the software product based on identifying that the array of pre-upgrade procedures successfully completed execution.

19 Claims, 8 Drawing Sheets

(56) References Cited

U.S. PATENT DOCUMENTS

| | | | |
|---|---|---|---|
| 2013/0232481 A1* | 9/2013 | Yamashita | G06F 9/445 |
| | | | 717/177 |
| 2016/0162275 A1* | 6/2016 | Morley | G06F 8/65 |
| | | | 717/170 |
| 2017/0344354 A1* | 11/2017 | Schiefelbein | G06F 8/61 |

* cited by examiner

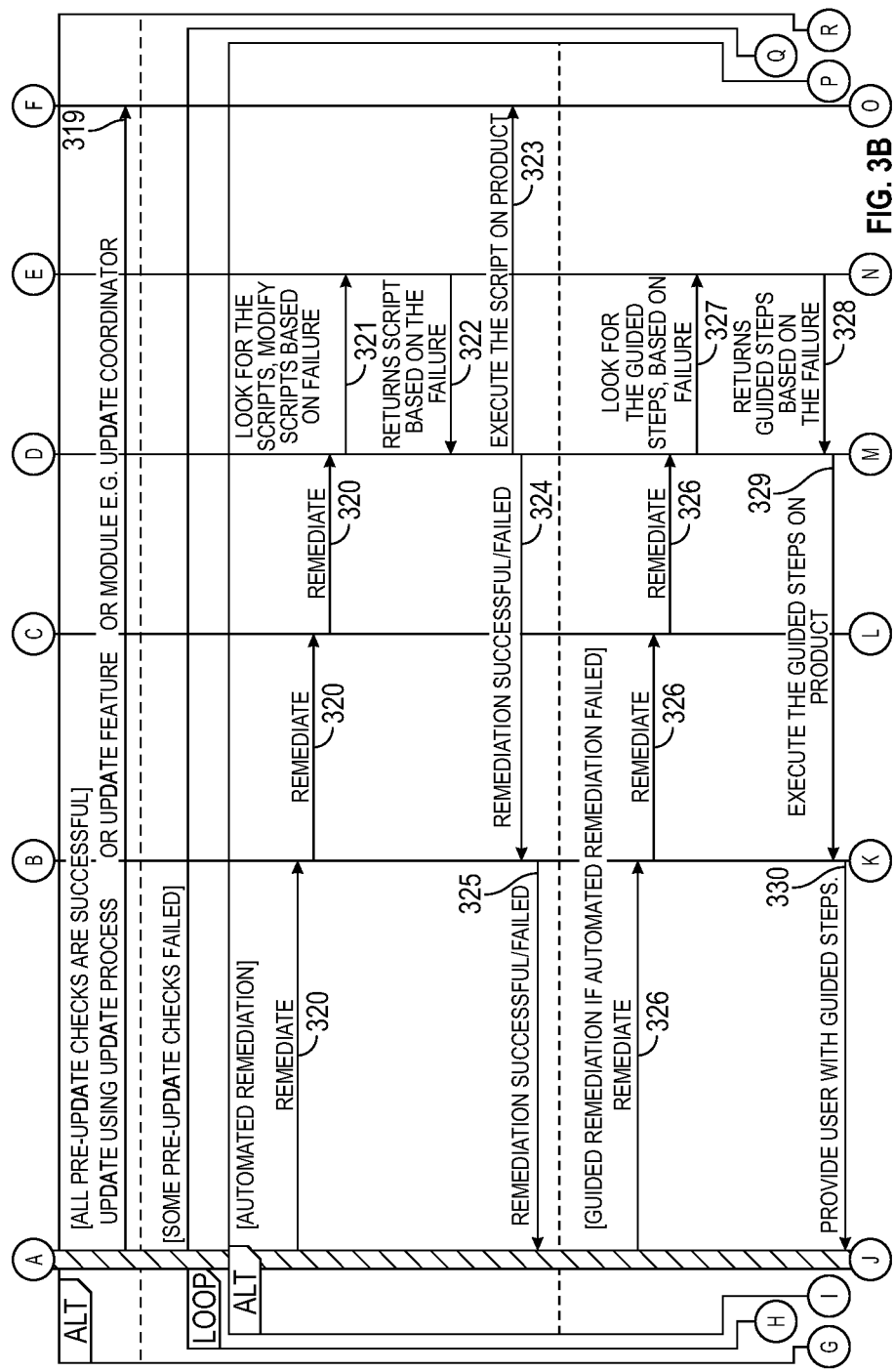

600
```
{
  "PRODUCT": "SOFTWARE A",
  "TYPE": "PRE-UPGRADE",
  "SUPPORTED_FROM_VERSIONS": [2.4, 2.5],
  "TO-VERSION": 3.0,
```
602

```
  "CHECKS": [
    {
      "ID": "FREE_SPACE_CHECK_TMP",
      "NAME": "CHECK FOR SUFFICIENT FREE SPACE ON /TMP PARTITION",
      "DESCRIPTION": "THIS CHECK WILL RESULT IN WARNING IF FREE SPACE IN /TMP PARTITION ON SOFTWARE A MANAGER IS LESS THAN 751 MB.",
      "COMPONENT_TYPE": "MP"
    },
    {
      "ID": "FREE_SPACE_CHECK_IMAGE",
      "NAME": "CHECK FOR SUFFICIENT FREE SPACE ON /IMAGE PARTITION",
      "DESCRIPTION": "THIS CHECK WILL RESULT IN WARNING IF FREE SPACE IN / IMAGE PARTITION ON SOFTWARE A MANAGER IS LESS THAN 1502 MB.",
      "COMPONENT_TYPE": "MP"
    },
    {
      "ID": "FREE_SPACE_CHECK_CONFIG",
      "NAME": "CHECK FOR SUFFICIENT FREE SPACE ON /CONFIG PARTITION",
      "DESCRIPTION": "THIS CHECK WILL RESULT IN WARNING IF FREE SPACE IN / CONFIG PARTITION ON SOFTWARE A MANAGER IS LESS THAN 14818 MB.",
      "COMPONENT_TYPE": "MP"
    },
    {
      "ID": "BACKUP_CHECK",
      "NAME": "BACKUP OPERATION CHECK",
      "DESCRIPTION": "WARNS IF BACKUP IS NOT TAKEN RECENTLY AND IF BACKUP IS IN PROGRESS",
      "COMPONENT_TYPE": "MP"
    }
  ],
```
604

```
  "ADDITIONAL_CHECKS": [
    {
      "ID": "MANAGER_CLUSTER_CHECK",
      "NAME": "MANAGER CLUSTER STATUS CHECK",
      "DESCRIPTION": "CHECK FOR STABLE MANAGER CLUSTER STATUS",
      "COMPONENT_TYPE": "MP",
      "SOURCE": "HTTPS://<URL>/CHECKS/MANAGER_CLUSTER_CHECK.PY"
    },
    {
      "ID": "CONTROLLER_CLUSTER_CHECK",
      "NAME": "CHECK CONTROLLER NODE CONNECTION STATUS",
      "DESCRIPTION": "CHECK THAT ALL CONTROLLER NODES ARE CONNECTED TO THE SOFTWARE A MANAGER AND ARE CONNECTED TO THE CONTROL CLUSTER.",
      "COMPONENT_TYPE": "MP",
      "SOURCE": "HTTPS://<URL>/CHECKS/CONTROLLER_CLUSTER_CHECK.PY"
    }
  ]
}
```
606

FIG. 6

SYSTEM AND METHOD OF ANALYZING UPDATE READINESS FOR DISTRIBUTED SOFTWARE SYSTEMS

BACKGROUND

A software-defined data center (SDDC) may comprise a plurality of hosts in communication over a physical network infrastructure. Each host is a physical computer (physical machine) that may run one or more virtualized endpoints such as virtual machines (VMs), containers, and/or other virtual computing instances (VCIs) (referred to herein interchangeably as VCIs). In some cases, VCIs are connected to software-defined networks (SDNs), also referred to herein as logical overlay networks, which may span multiple hosts and are decoupled from the underlying physical network infrastructure.

The hosts, physical computers, and/or VCIs (collectively referred to as machines) may execute one or more programs, operating systems, or the like (referred to herein interchangeably as "software products") that provide various features, functionality, and/or services to various users, such as clients and end users. As capabilities, features, and/or functionality of the software product change, are added, and/or are improved, the software product may require updating or migration to a new version or new software. For example, virtualization products, like other programs, undergo lifecycle events. Such events, which may occur as upgrades, changes, rollbacks, and/or migrations (referred to herein interchangeably as "updates"), are commonplace and may occur multiple times throughout a software product's lifecycle.

The occurrence of updates may fundamentally affect performance, reliability, and/or availability of the software products and the corresponding machines running the software products. For example, when updating a software product (for example, upgrading from a first version to a second version or migrating from one software product to another software product), the update may fail before being completed. Such a failure may leave the software product (and, thus, the machine) in an undesirable state and/or condition. For example, in a best-case scenario, the failure of the update may simply leave the software product in an initial, pre-update state, meaning the software product does not have the capabilities, features, and/or functionality changed, added, or improved by the update. In a worst-case scenario, the failed update of the software product may leave the software product in an inoperable state or in a state where the software product operates improperly. Thus, failure of an update may cause clients to request assistance while they experience the undesirable states and/or conditions, which may cause downtime and/or unreliability for the clients.

The failure of the update may occur due to prerequisite update requirements for the software product and/or machine having not been met before initiating the update. For example, the update requirements may include confirming that an initial (or first) software product (for example, the software product before the update) and a target (or second) software product (for example, the desired software, version, etc., after the update) are compatible or that sufficient resources are available for updating the software product. In some embodiments, the updates may prevent the software product and corresponding hardware from providing the various features, functionality, and/or services to the various users.

Because updates to software products are commonplace, and because interaction with and use of technologies that operate based on or utilize the software products are only increasing, the need and importance of updates cannot be ignored and corresponding failures should be avoided. Instead, updating the software products should be made a smooth and simple process. Accordingly, there is a need in the art for improved techniques for analyzing update readiness for the software product to make the update process smoother and simpler with fewer failures or issues.

BRIEF DESCRIPTION OF THE DRAWINGS

FIGS. 3A-3C depict an example of call flows between the various components of FIG. 1 for verifying update readiness according to embodiments of the present disclosure.

FIG. 6 depicts pseudocode for a sample module descriptor file.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
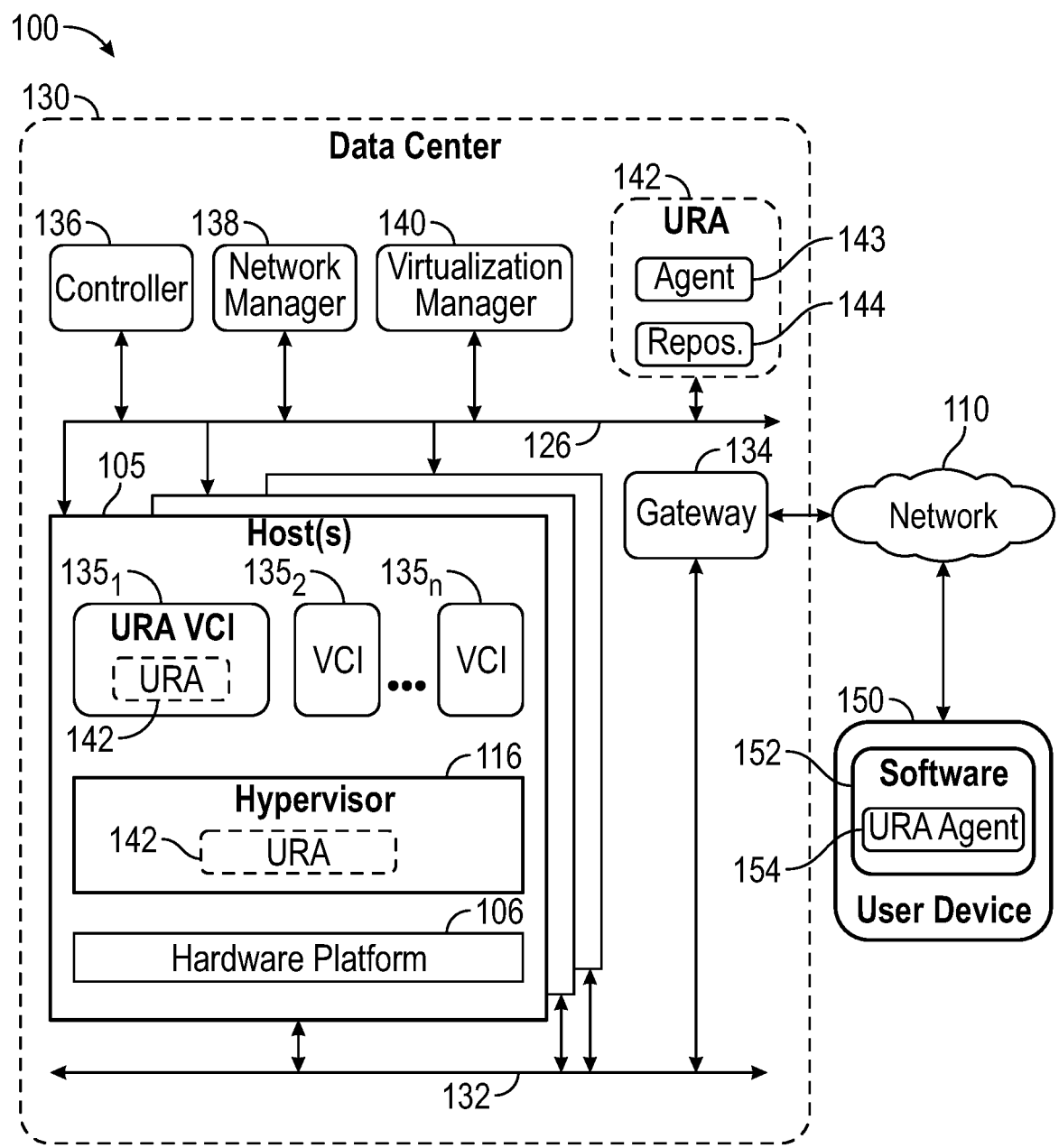
FIG. 1 depicts example physical and virtual network components with which embodiments of the present disclosure may be implemented.

The present disclosure provides an approach and framework for pre- and post-update readiness for software products. In particular, techniques and aspects described herein allow a user, such as a client or consumer of cloud resources or an administrator of one or more machines, to identify pre-emptively issues that would cause an update of the software product to fail before the update is complete or that may render the post-update software product unusable or in an undesirable state. Thus, based on the approach and framework described herein, the user may remediate such issues before beginning the update and, therefore, avoid preventable failure of the update.

For example, a software developer may provide updates for software products developed by the developer and, therefore, manage update readiness for the software products installed on machines. To assist with managing the update readiness, the developer may maintain and provide an update readiness assistant (URA) that manages the updates for the software products. The URA may maintain a software agent that establishes and communicates with a corresponding software agent installed on or otherwise associated with a software product being updated. Together, the URA agent and the software product agent may ensure that the software product and the machine executing the software product are ready for the software update (for example, in a condition where pre- and post-update requirements and/or conditions (referred to herein interchangeably as requirements) are met). Thus, the URA agent and the software product agent can ensure completion or verification of any requirement(s) that, if not completed, may inhibit proper completion of the update. Accordingly, the URA agent and the software product agent can work together to ensure that the update will be successful and will not result in the software product being inoperable or operating improperly following the update. Furthermore, the URA agent and the software product agent may enable the user to employ customized checks as part of the pre- and/or post-update requirement checks. Thus, the framework described herein can help manage updates and ensure readiness of software products for corresponding updates to reduce downtime and other issues that may result from problematic updates to the software products.

The software products may have a name or identifier (referred to herein as a name) and current version information (referred to herein as a version identifier). For example, the software product may have a name of "Software A" and a version identifier of "Version 1". Some upgrade assistants are limited to confirming simple requirements of machines for a single associated software product. More specifically, some upgrade assistants may work with specific upgrades and confirm requirements for the associated software product before initiating the update. For example, some upgrade assistants for upgrading Software A Version 1 to Version 2 may include requirements specific to that upgrade, such as received confirmation that the software to update is Software A Version 1 (as opposed to another software or another version). Similarly, the update assistant for migrating Software B Version 1 from a first machine to a second machine may include requirements specific to the migration, such as received confirmation that the second machine has sufficient resources (for example, memory, processing power, and the like) to support the migrated Software B Version 1.

However, such upgrade assistants do not provide a framework or mechanism to enable use of the upgrade assistant to perform updates (for example, upgrades or migrations) for other or various software products. The framework described herein may enable the developer that provides a number of different software products that each have a number of available software updates to employ the same URA. For example, while the some upgrade assistants manage upgrades for individual products, the disclosed framework provides a URA that can manage updates for different software products, software versions, migrations between different hardware, and the like. Thus, the framework herein utilizes the URA that manages updates for many software products, for example, of a developer or client. The URA may manage requirements before and/or after a software product update. For example, the URA may verify that the software product involved in an update meets specific requirements before the update is permitted to begin, such as being a compatible version with the target update, having sufficient storage space to complete the update, having sufficient hardware requirements to operate with the target updates, have sufficient a power level to complete the update, and the like. Similarly, the URA may verify that the software product meets specific requirements after the update completes, such as essential services being available, and the like. Such comprehensive mechanisms and frameworks that enable interaction between different software products do not exist in the prior art.

FIG. 1 depicts example physical and virtual network components of a networking environment 100 with which embodiments of the present disclosure may be implemented.

The networking environment 100 includes a data center 130 connected to a network 110. The network 110 is generally representative of a network of computing entities, such as a local area network ("LAN") or a wide area network ("WAN"), a network of networks, such as the Internet, or any connection over which data may be transmitted between connected computing entities.

The data center 130 generally represents a set of networked computing entities, and may comprise a logical overlay network. The data center 130 includes host(s) 105, a gateway 134, a data network 132, which may be a Layer 3 network, and a management network 126. The data network 132 and the management network 126 may be separate physical networks or different virtual local area networks (VLANs) on the same physical network.

Each of the hosts 105 may be constructed on a server grade hardware platform 106, such as an x86 architecture platform. For example, the hosts 105 may be geographically co-located servers on the same rack or on different racks. Each host 105 is configured to provide a virtualization layer, also referred to as a hypervisor 116, that abstracts processor, memory, storage, and networking resources of the hardware platform 106 into multiple virtual computing instances (VCIs) 1351 to 135. (collectively referred to as VCIs 135 and individually referred to as VCI 135) that run concurrently on the same host 105. The VCIs 135 may include, for instance, VMs, containers, virtual appliances, and/or the like.

The hypervisor 116 may run in conjunction with an operating system (not shown) in the host(s) 105. In some embodiments, the hypervisor 116 can be installed as system level software directly on the hardware platform 106 of the host 105 (often referred to as "bare metal" installation) and be conceptually interposed between the physical hardware and the guest operating systems executing in the virtual machines. In certain aspects, the hypervisor 116 implements one or more logical entities, such as logical switches, routers, etc., as one or more virtual entities, such as virtual switches, routers, etc. In some implementations, the hypervisor 116 may comprise system level software as well as a "Domain 0" or "Root Partition" virtual machine (not shown) which is a privileged machine that has access to the physical hardware resources of the host 105. In this implementation, one or more of a virtual switch, virtual router, virtual tunnel endpoint (VTEP), etc., along with hardware drivers, may reside in the privileged virtual machine. Although aspects of the disclosure are described with reference to VMs, the teachings herein also apply to other types of virtual computing instances (VCIs) or data compute nodes (DCNs), such as containers, which may be referred to as Docker containers, isolated user space instances, namespace containers, etc. In certain embodiments, the VCIs 135 may be replaced with containers that run on the host 105 without the use of the hypervisor 116, and so forth.

The gateway 134 provides the VCIs 135 and other components in the data center 130 with connectivity to the network 110, and is used to communicate with destinations external to the data center 130, such as a user device 150. The gateway 134 may be a virtual computing instance, a physical device, or a software module running within the host 105.

The controller 136 generally represents a control plane that manages configuration of the VCIs 135 within the data center 130. The controller 136 may be a computer program that resides and executes in a central server in the data center 130 or, alternatively, the controller 136 may run as a virtual appliance (e.g., a VM) in one of the hosts 105. Although shown as a single unit, it should be understood that the controller 136 may be implemented as a distributed or clustered system. That is, the controller 136 may include multiple servers or virtual computing instances that implement controller functions. Implementing a control plane as a cluster, as well as various sharding techniques for distributing data by a clustered control plane, is described in more detail in U.S. Pat. No. 10,447,535, the contents of which are incorporated herein by reference in their entirety. The controller 136 is associated with one or more virtual and/or physical CPUs (not shown). Processor(s) resources allotted or assigned to controller 136 may be unique to controller 136, or shared with other components of the data center 130. The controller 136 may communicate with the hosts 105 via the management network 126.

Network manager 138 and virtualization manager 140 generally represent components of a management plane comprising one or more computing devices responsible for receiving logical network configuration inputs, such as from a network administrator, defining one or more endpoints (e.g., VCIs and/or containers) and the connections between the endpoints, as well as rules governing communications between various endpoints. In one embodiment, the network manager 138 is a computer program that executes in a central server in the networking environment 100, or alternatively, the network manager 138 may run in a VCI 135, e.g., in one of the hosts 105. Although shown as a single unit, the network manager 138 may be implemented as a distributed or clustered system. That is, the network manager 138 may include multiple servers or VCIs that implement management functions. The network manager 138 is configured to receive inputs from an administrator or other entity, e.g., via a web interface or API, and carry out administrative tasks for the data center 130, including centralized network management and providing an aggregated system view for a user.

In an embodiment, the virtualization manager 140 is a computer program that executes in a central server in the data center 130 (e.g., the same or a different server than the server on which the network manager 138 executes), or alternatively, the virtualization manager 140 runs in one of the VCIs 135. The virtualization manager 140 is configured to carry out administrative tasks for data center 130, including: managing the hosts 105, managing the VCIs 135 running within each host 105, provisioning the VCIs 135, transferring the VCIs 135 from one host 105 to another host 105, transferring the VCIs 135 between data centers 130, transferring application instances between the VCIs 135 or between the hosts 105, and load balancing among the hosts 105 within the data center 130. The virtualization manager 140 may take commands from components located on the management network 126 as to creation, migration, and deletion decisions of the VCIs 135 and application instances on the data center 130. However, the virtualization manager 140 may also make independent decisions on management of local VCIs 135 and application instances, such as placement of the VCIs 135 and application instances between the hosts 105. In some embodiments, the virtualization manager 140 also includes a migration component (not shown) that performs migration of the VCIs 135 between the hosts 105, such as by live migration.

The user device 150 may include a computing device configured to communicate with the data center 130 (and the components thereof) via the network 110 and the gateway 134. The user device 150 may implement or support software products, such as an operating system, a web browser, another application, and the like. In some embodiments, the user device 150 corresponds to a host 105 that runs one or more VCIs 135. The user device 150 may execute one or more software products 152 that have individualized update lifecycles. Though shown outside of the data center 130, the user device 150 may be within the data center 130, such as coupled to one or more of the data network 132 or the management network 126. The one or more software products 152 may comprise operating systems, program systems, and the like.

The data center 130 may further comprise an update readiness assistant (URA) 142. The URA 142 may generally represent an appliance or similar component of the data center 130 that assists with and manages update readiness for software products associated with one or more user devices 150, hosts 105, and the like. The URA 142 may be configured to manage requirements to be met before and/or after an update to the software product is installed on a user device 150, a host 105, and the like. The URA 142 may be a standalone appliance or be integrated into one or more other components of the data center 130. For example, the VCI 135₁ may comprise the URA 142. Furthermore, in some embodiments, the hypervisor 116 may implement the URA 142, for example, when the URA 142 is a Docker container instance.

The URA 142 comprises a URA agent 143 and an update module repository 144. The URA agent 143 manages interactions between the URA 142 and the one or more software products being updated. As described herein, the URA 142 manages update readiness for the one or more software products, such as a software product 152 executed on or by the user device 150. However, in other embodiments, the URA 142 manages update readiness for a number of different software products 152 across multiple user devices 150, hosts 105, and/or VCIs 135.

As described in further detail below, managing the update readiness for the software product 152 with the URA 142 comprises multiple steps. For example, the URA agent 143 may register the software product 152 with the URA 142. The URA agent 143 may establish and maintain communications with software products 152 having updates managed by the URA 142. The URA agent 143, as part of the registration of the software product 152, may cause the software product 152 to install a corresponding URA agent 154 on or associated with the software product 152. Using the URA agent 154, the URA agent 143 may obtain information about the software product 152 and/or the user device 150 on which the software product 152 operates, for example, when checking requirements as part of the pre- and/or post update requirements. For example, the URA agent 143 can ask the URA agent 154 to identify whether the user device 150 has sufficient storage space in a particular directory, or the like. Because the URA agent 154 runs on the user device 150, the URA agent 154 may have access to and communicate the requested information back to the URA agent 143.

The repository 144 may store various information associated with the software updates, including matrices of available update options or paths, modules for the pre- and post-update that comprise arrays of pre- and post-update requirements, respectively, remediation modules, and the like. In certain embodiments, the repository 144 may be a central repository that exists at a single location or multiple locations and/or cloud-based repository for storing the information associated with the software updates. In certain embodiments, the repository 144 may be representative of an on-premise or cloud-based repository. In some embodiments, the repository 144 is a logical or virtual storage, backed by physical storage. In some embodiments, the repository 144 is a physical storage, such as a set of one or more disk drives (solid state drives (SSDs), hard disk drives (HDDs), etc.). The URA 142 (for example, via the URA agent 143) may access the repository 144 to identify the pre- and/or post-update modules comprising the requirements to check with the software product 152 and/or the user device 150. For example, the repository 144 may include a pre-update module comprising a requirement that the user device 150 have sufficient storage space for the update. Accordingly, the URA agent 143 may request information regarding available storage space from the URA agent 154, and determine if the user device 150 has sufficient storage space according to the requirement indicated in the pre-update module. The repository 144 may contain details regarding the pre-defined, common pre- and post-update checks, for example, in the pre- and post-update modules and pre- and post-remediation modules for software products supported by the URA 142. For example, each software product provided by the developer may have its own pre- and/or post-update module comprising requirements for that software product that are to be confirmed via the URA agents 143 and 154, before and/or after the update. The requirements in these modules may be used by the URA agents 143 and 154 as-is or in one or more combinations to form more complex examinations for specific products and/or versions. Thus, Software A Version 1 may have its own pre- and post-update modules (and, therefore, requirements) as compared to Software A Version 2 and Software B Version 1, and so forth.

In some embodiments, a user of the user device 150 can enhance and customize a pre- and/or post-update module in the repository 144 by editing an existing requirement and/or adding one or more new pre- and post-update requirements for a particular software product. For example, the user (for example, an administrator) of the user device 150 may have specific features or concerns for the user device 150 and add a requirement to the pre- and post-update modules for the software products executed on the user device 150. For example, the user device 150 may include Software A Version 1 and Software B Version 2. The administrator of the user device 150 may want to ensure that any update to these software products on the user device 150 leave at least 50% of the storage capacity available after completion of the update. As such, the administrator may introduce a custom requirement into all pre- and post-update modules for the Software A Version 1 and Software B Version 2 software products, as stored in the repository 144, which requires more than 50% of the storage capacity to be available after the update. Furthermore, the administrator may add entire custom pre- and/or post-update modules to ensure one or more specific requirement checks pre- and/or post-update. Such requirements may be added to the pre- and post-update modules for the corresponding software products in the repository 144.

As described herein, the user device 150 may provide access to one or more software products that are updated to one or more new versions and/or software products. The update of the software product may be managed by the URA 142.

Figure 2:
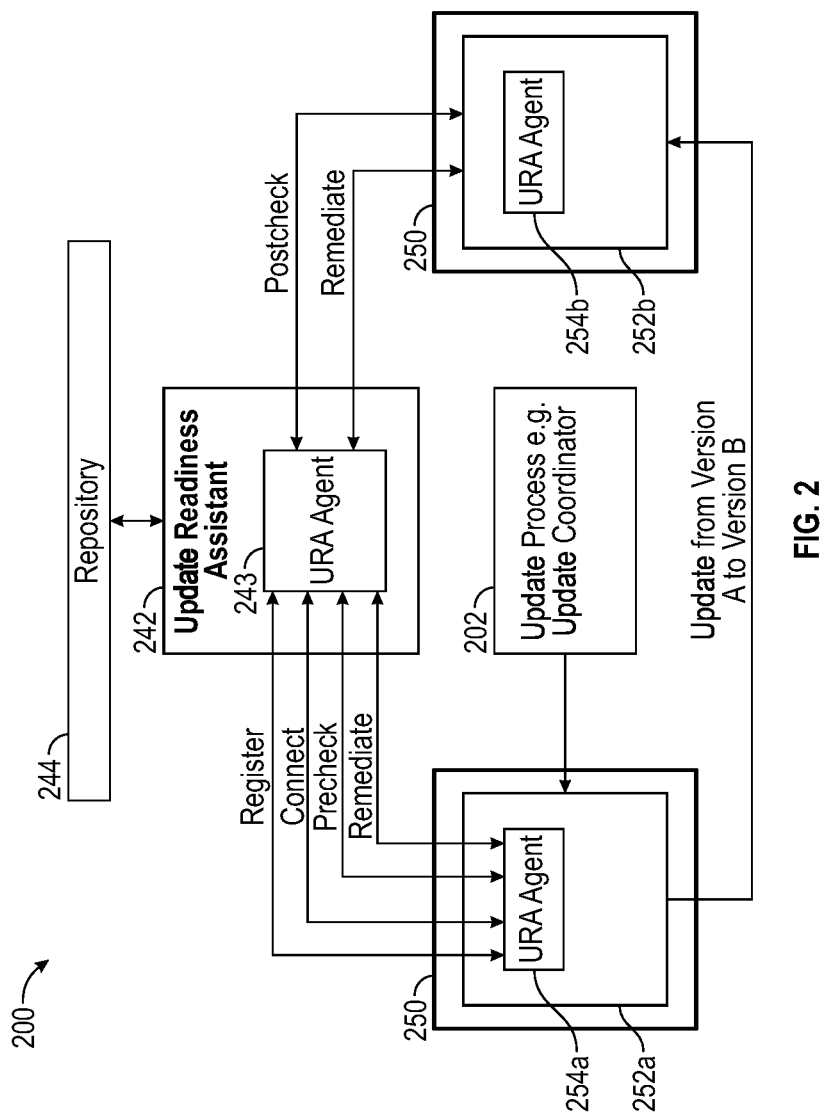
FIG. 2 depicts an example of data flows between various components of FIG. 1 according to embodiments of the present disclosure.

FIG. 2 depicts an example data flow 200 between various networked components, for example, of the networking environment 100 of FIG. 1 according to embodiments of the present disclosure. Specifically, the data flow 200 shows communications that occur between a software product 252 (being updated from a first version of the software product 252a to a second version of the software product 252b by an update process 202) and a URA 242. The URA 242 includes a URA agent 243 and a repository 244. The software product 252 may represent a software product similar to the software product 152 of FIG. 1. Similarly, the URA 242, the URA agent 243, the repository 244, and the URA agent 254 may represent a URA similar to the URA 142, a URA agent similar to the URA agent 143, a repository similar to the repository 144, and a URA agent similar to the URA agent 154, respectively. The software product 252a being updated from version A to version B of the software product 252b may operate on a user device 250, which may represent a user device similar to the user device 150.

The update process 202 that updates the software product 252a to the software product 252b may comprise a coordinator or module implemented by a controller, a processor, or the like that implements the update of the software product 252a of the version A to the software product 252b of the version B.

The URA 242 may manage the update of the software product 252a to the software product 252b via the update process 202. As such, before the update process 202 is able to update the software product 252a to the software product 252b, the user of the user device 250 may register the software product 252a with the URA 242, as introduced above. More specifically, the user may register the software product 252a with the URA agent 243. During the registration of the software product 252a with the URA agent 243, the URA agent 243 may cause the software product 252a to install the corresponding URA agent 254a. Thus, registering the software product 252a with the URA agent 243 may result in installation of the URA agent 254a on the user device 250 running the software product 252a such that the URA agent 254a is able to identify various aspects about the software product 252 and the user device 250. Using this access, the URA agent 254a may provide information regarding the software product 252a and/or the user device 250 to the URA agent 243, for example, in response to one or more requirements in a pre- and/or post-update module.

Based on the registration with the URA 242 and the installation of the URA agent 254a at the software product 252a, the URA agent 243 and the URA agent 254a may initiate communications using a channel established therebetween. The URA agent 243 may use the channel with the URA agent 254a to convey an update matrix associated with the software product 252a to the URA agent 254a. The update matrix may include details regarding update compatibility and available updates for the software product 252. The URA agent 243 may identify the update matrix for the software product 252a in the repository 244 based on registration information for the software product 252a. As introduced above, the registration information may include a name for the software (for example, "Software A") and a version identifier (for example, "Version 1") of the software product 252a. Alternatively, the URA agent 243 and the URA agent 254a may exchange software and version identifiers for the software product 252 over the channel after registering the software product 252a with the URA 242. In some embodiments, each software product (for example, each configuration of the name and the version identifier for a given software product 252) may have its own update matrix stored in the repository 244. Thus, the repository 244 may comprise a number of update matrices from which the URA agent 243 identifies and accesses the appropriate update matrix for the given software product 252a installed on the user device 250 that is being updated. In some embodiments, the software product 252a will have a single update matrix that includes and identifies all updates between versions that are available for the software product 252a. In some embodiments, the software product 252 will have a single update matrix for each update pair (for example, for each pair of current name/version and target name/version) such that any given software product 252 may include multiple update matrices available for selection by the URA agent 243. Thus, the URA agent 243 may utilize an indication of a selected target software product 252b to identify the appropriate update matrix for the given software product 252a.

Each update matrix may identify available updates for corresponding software products 252 and, thus, be specific to one of the software products 252. For example, the Software A Version 1 software product 252a may have a different update matrix than the Software A Version 3 software product 252b and a Software B Version 2 software product, and so forth. The URA agent 243 may share the update matrix with the URA agent 254a to enable selection of a desired update path or target software product. For example, when the software product 252a is the Software A Version 1, the update matrix for the software product 252a may identify available target software products of Software A Version 3 and Software A Version 4. The URA agent 254a may select and communicate the selection of one of Software A Version 3 and Software A Version 4 as the target software product 252b to the URA agent 243. In some instances, the URA agent 254a may automatically select the latest version (for example, Version 4) as the target software product 252b or select the next incremental version (for example, Version 3) as the target software product 252b based on one or more parameters or settings. Alternatively, the user (or administrator) may make the selection of the target software product 252b, which the URA agent 254a provides to the URA agent 243.

Based on the selected target software product, the URA agent 243 may access one or more pre-check modules for the software product 252a from the repository 244. Similar to the update matrices introduced above, different pre-check modules may apply to the software product 252a dependent on the current version of the software product 252a and the target version of the software product 252b. For example, the update of the Software A Version 1 to Software A Version 3 may utilize pre- and/or post-check modules that are different from the update of the Software A Version 1 to Software A Version 4 and/or Software B Version 1. As introduced above, the pre- and/or post-check modules may include code, instructions, scripts, programs, and the like (referred to herein interchangeably as scripts) for the URA agent 243 and/or the URA agent 254a to execute. The scripts, when executed, may cause the URA agent 243 and/or the URA agent 254a to determine whether requirements and/or checks are met before the update process 202 updates the software product 252a to the software product 252b. For example, the scripts, when executed by the URA agent 243 and/or the URA agent 254a, may one or more of:

1. Check that the hardware and software configuration of the software product 252a and/or the user device 250 supports the selected update (for example, the software product 252a and/or the user device 250 comprise compatible firmware, network interface controller (NIC) types, NIC policies, storages hardware, and the like),
2. Check that the selected target software product 252b is a valid update option based on the update matrix for the software product 252a,
3. Ensure that the user device 250 (or corresponding system) is not serving workloads and is in an acceptable state or mode for the update (for example, in a maintenance mode),
4. Ensure utilized/required resources are available for the update, including, for example, CPU bandwidth, memory, storage on the user device 250 before and during the update, and the like,
5. Check that the user device 250 and the software product 252a are configured appropriately to be compatible with the update of the software product 252a to the software product 252b,
6. Ensure availability of essential services (such as web services, cluster or clustering services, database services, high availability services, and the like) before the update,
7. Check that networking settings and configurations for the user device 250 and/or the software product 252a are appropriate for the update,
8. Ensure that a current state of the software product 252a and/or the user device 250 is saved and/or backups are taken of the software product 252a and/or the user device 250,
9. Perform a dry run of the update on a clone of the software product 252a (or a subset thereof),
10. Check that the target software product 252b will be compatible with one or more of the user device 250 (or corresponding) hardware, such as CPU, storage, and/or memory and/or an appliance type of the target software product 252b (for example, standalone, cluster with roles, and the like),
11. Remove outdated and/or unused data and logs from the software product 252a and/or the user device 250,
12. Cleanup background jobs and/or schedulers and unwanted data and/or logs,
13. Check for dangling references that can cause data migration failures,
14. Check that certificates and licenses for the updated software product 252b exist as required,
15. Check that passwords will not expire is near future (and will not expire during the update),
16. Check for communication between appropriate servers and/or services (for example, Network Time Protocol (NTP), domain name systems (DNS), Active Directory (AD), Remote Log Servers, and so forth),
17. Confirm port status, external database (DB) size, network policy (such as MAC address change (switch security)) requirements are met,
18. Ensure that the administrators or other users assisting with the update have appropriate access privileges for the user device 250 and/or the software product 252a/252b, and
19. Ensure communication and port connectivity exists between various appropriate components in the networking environment 100.

As introduced above, one or more of the URA agent 243 and the URA agent 254a may execute the scripts of the pre-update module to determine that the corresponding requirements identified in the pre-update module are met. Where the URA agent 243 and/or the URA agent 254a determine that all of the requirements are met, the URA agents 243 and/or 254 may permit the update process 202 to perform the update of the software product 252a to the software product 252b.

However, where the URA agent 243 and/or the URA agent 254a identify that one or more of the requirements in the pre-update module are not met (for example, that the requirement check fails or failure of a pre-update or pre-upgrade procedure), the URA agent 243 and/or the URA agent 254 do not permit the update process 202 to initiate the update of the software product 252a. Instead, the URA agent 243 and/or the URA agent 254a my trigger, initiate, or execute one or more remediation measures from a remediation module obtained from the repository 244 to cure the requirement check(s) failure. The URA agent 243 and/or the URA agent 254a may execute the remediation measures to cure the failed requirement checks from the pre-update module to enable the update of the software product 252a. Once the failed requirement checks are cured based on the remediation measures (meaning that the requirement is now met and the corresponding check is successful), the URA agent 243 and/or the URA agent 254a may allow the update process 202 to perform the update of the software product 252a.

In some embodiments, the one or more remediation modules stored in the repository 244 identify or include the one or more remediation measures. The remediation modules, similar to the pre- and/or post-update modules, may comprise scripts and/or the like for the URA agent 243 and/or the URA agent 254a to execute to cure the failed requirement check. The remediation modules may be specific to one or more of the requirements or the software product 252a. For example, certain requirements that are specific to a particular software product 252a (for example, the check that the user device 250 and the software product 252a are configured appropriately to be compatible with the update) may have a corresponding remediation module that is specific to the software product 252a. On the other hand, where the requirement is not specific to the software product 252a (for example, the check that passwords will not expire in the near future (and, thus, will not expire during the update)), the corresponding remediation module may be specific to the requirement but not necessarily specific to the software product 252a. In some embodiments, the URA agent 243 may identify the one or more remediation modules to execute based on the failed requirement check(s). For example, each requirement of the pre-update module may have an identifier that can be used to identify the remediation module in the repository 244 that will cure the corresponding failed requirement check. In some embodiments, the URA agent 243 and/or the URA agent 254a may invoke and/or generate the remediation measures (and the corresponding scripts and the like) based on a type of failure such that the executed script will cure the issues that caused the failure of the requirement check(s). Once the remediation measure(s) is performed, the URA agent 243 and/or the URA agent 254 may re-execute the pre-update module to ensure that all the requirements are successfully remediated and that the checks of the pre-update module all pass or are completed to allow the update of the software product 252a.

In some embodiments, the URA agent 243 and/or the URA agent 254a may execute the remediation modules in different ways or execute different types of remediation modules. For example, the URA agent 243 and/or the URA agent 254a may apply the corresponding remediation measures automatically (for example, for automatic or autonomous type remediation modules) without or with minimal user involvement to cure the failure of the requirement check(s) from the pre-update module. Accordingly, the URA agent 243 and/or the URA agent 254a may execute the remediation measures on or for the software product 252a and/or the user device 250 to remediate the failed requirement check(s).

Alternatively, the URA agent 243 and/or the URA agent 254a may provide guided instructions (for example, to the user of the user device 250) to cure the failed requirements. For example, the URA agent 243 and/or the URA agent 254a may apply the corresponding remediation measures semi-automatically (for example, for semi-automatic, semi-autonomous, or guided instruction type remediation modules) with a level of user involvement to cure the failure of the requirement check from the pre-update module. Thus, the URA agent 243 and/or the URA agent 254 may provide instructions to guide the user through one or more steps that will enable the user to cure the failed requirement checks. In some embodiments, the instructions may be specific to the remediation measure(s) needed to cure the failed requirement check.

Furthermore, in some embodiments, the URA agent 243 and/or 254a may instruct the user to remediate the failed requirement check without providing further instruction. For example, the URA agent 243 and/or the URA agent 254a may apply the corresponding remediation measures such that the user manually cures the failure of the requirement check from the pre-update module (for example, for manual type remediation modules).

In some instances, the URA agent 243 and/or the URA agent 254a may increment through the automatic, guided (or semi-automatic), and manual remediation modules itself, for example, based on how successful each type of module is at curing the requirement check failures. For example, the URA agent 243 and/or the URA agent 254a may first employ the automatic remediation to cure the requirement check failure from the pre-update module requirement check. If the automatic remediation is unable to cure the requirement check failure (as determined by re-executing the pre-update module), the URA agent 243 and/or the URA agent 254a may further employ the semi-automatic, or guided instruction, remediation module to cure the requirement check failure. Should the semi-automatic remediation module not cure the requirement check failure (as determined re-executing the pre-update module), the URA agent 243 and/or the URA agent 254a may finally employ the manual remediation module, instructing the user to cure the requirement check failure.

In some embodiments, the type of or specific requirement may dictate whether the URA agent 243 and/or the URA agent 254a selects the automatic, semi-automatic, and/or manual remediation module(s). For example, failure of some requirement checks (such as "[c]heck[ing] that passwords will not expire is near future (and will not expire during the update)") may be cured by the URA agent 243 and/or the URA agent 254a employing an automatic remediation module. However, failure of other requirement checks (such as "[e]nsur[ing] that the administrators or other users assisting with the update have appropriate access privileges for the user device 250 and/or the software product 252a") may be cured by the URA agent 243 and/or the URA agent 254a employing a semi-automatic remediation module. Finally, failure of certain requirement checks (such as "[e]nsur[ing] connectivity exists between various appropriate components in the networking environment 100") may be cured by the URA agent 243 and/or the URA agent 254a employing a manual remediation module for the user to cure any connectivity issues.

Once the update process 202 updates the software product 252a to the software product 252b, the URA agent 243 may access one or more post-check modules for the software product 252b from the repository 244. Similar to the update matrices, pre-update modules, and remediation modules introduced above, different post-check modules may apply to the software product 252b dependent on the name and version of the software product 252b. The scripts, when executed, may cause the URA agent 243 and/or the URA agent 254b to determine whether requirements are met (and/or requirement checks satisfied) following the update to the software product 252b. For example, the scripts, when executed by the URA agent 243 and/or the URA agent 254b, may one or more of:

1. Ensure that the software product 252b and/or the user device 250 (or corresponding system) is ready to go back into production,
2. Ensure that the user is able to perform basic administrative tasks on the software product 252b,
3. Ensure that one or more essential services are available for and/or via the software product 252b and/or the user device 250 and that actions associated with services (such as create, read, update, delete) work,
4. Perform a dry run on the software product 252b and/or the user device 250 of production traffic and workload,
5. Ensure that appropriate communication channels, interops and components are working, and
6. Check for additional automated and manual configurations to be done post-update.

One or more of the URA agent 243 and the URA agent 254b may execute the script to determine that the requirement checks identified in the post-update module accessed from the repository 244 are met. Where the URA agent 243 and/or the URA agent 254b determine that all of the requirement checks are met, the URA agents 243 and/or 254b may confirm that the update to the software product 252b is complete.

However, where the URA agent 243 and/or the URA agent 254b identify that one or more of the requirement checks in the post-update module are not met (for example, failure of a post-update or post-upgrade procedure), the URA agent 243 and/or the URA agent 254b do not confirm that the update is complete. Instead, the URA agent 243 and/or the URA agent 254b my trigger, initiate, or execute one or more remediation measures to cure the requirement check(s) failure. The URA agent 243 and/or the URA agent 254b may execute the remediation measures to cure the failed requirement checks from the post-update module requirement check to conclude the update. Once the failed requirement checks are cured based on the remediation measures, the URA agent 243 and/or the URA agent 254b may confirm that the update to the software product 252b is complete.

In some embodiments, one or more remediation modules stored in the repository 244 identify or include the one or more post-update remediation measures. The remediation modules may be specific to one or more of the requirements or the software product 252b. Similar to the pre-update remediation modules introduced above, the URA agent 243 may identify the one or more post-update remediation modules to execute based on the failed post-update requirement check(s). Once the remediation measure(s) is performed, the URA agent 243 and/or the URA agent 254b may re-execute the post-update module to ensure that all the requirement checks are successfully remediated.

Similar to the pre-update remediation measures, the URA agent 243 and/or the URA agent 254b may execute the post-update remediation measures in different ways or execute different types of remediation modules to remediate the failed requirement check(s).

Alternatively, the URA agent 243 and/or the URA agent 254b may provide guided instructions (for example, to the user of the user device 250) to cure the failed requirement checks. Furthermore, in some embodiments, the URA agent 243 and/or 254b may instruct the user to remediate the failed requirement check without providing further instruction.

Similar to the pre-update remediation discussion, the URA agent 243 and/or the URA agent 254b may increment through the automatic, guided (or semi-automatic), and manual remediation modules, for example, based on how successful each type of module is at curing the requirement failure checks. In some embodiments, the type of or specific requirement may dictate whether the URA agent 243 and/or the URA agent 254b selects the automatic, semi-automatic, and/or manual remediation module(s).

In some embodiments, the pre- and post-check modules described herein may comprise built-in or standard modules created by the developer and custom modules created by the developer or users of the software product or URA 242. The standard modules may specific software products or versions and pushed to the repository 244 when the URA 242 is deployed. The custom modules created by the developers may modify existing modules to have additional pre- and post-check capabilities or be new modules developed by developer. Additionally, the user may add custom modules with custom checks and/or modify and delete existing modules from the repository 244.

Figure 3A:
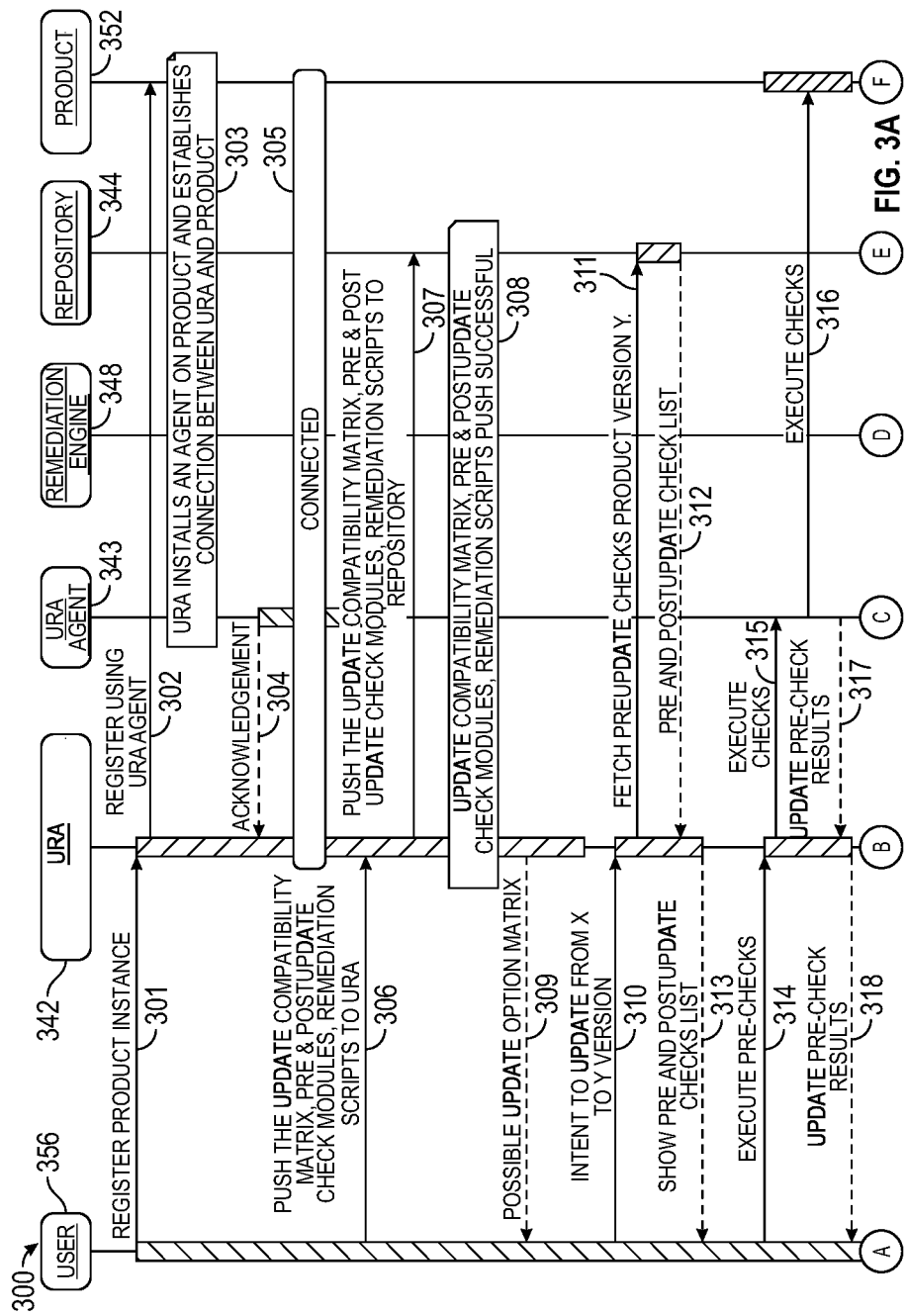
Figure 3C:
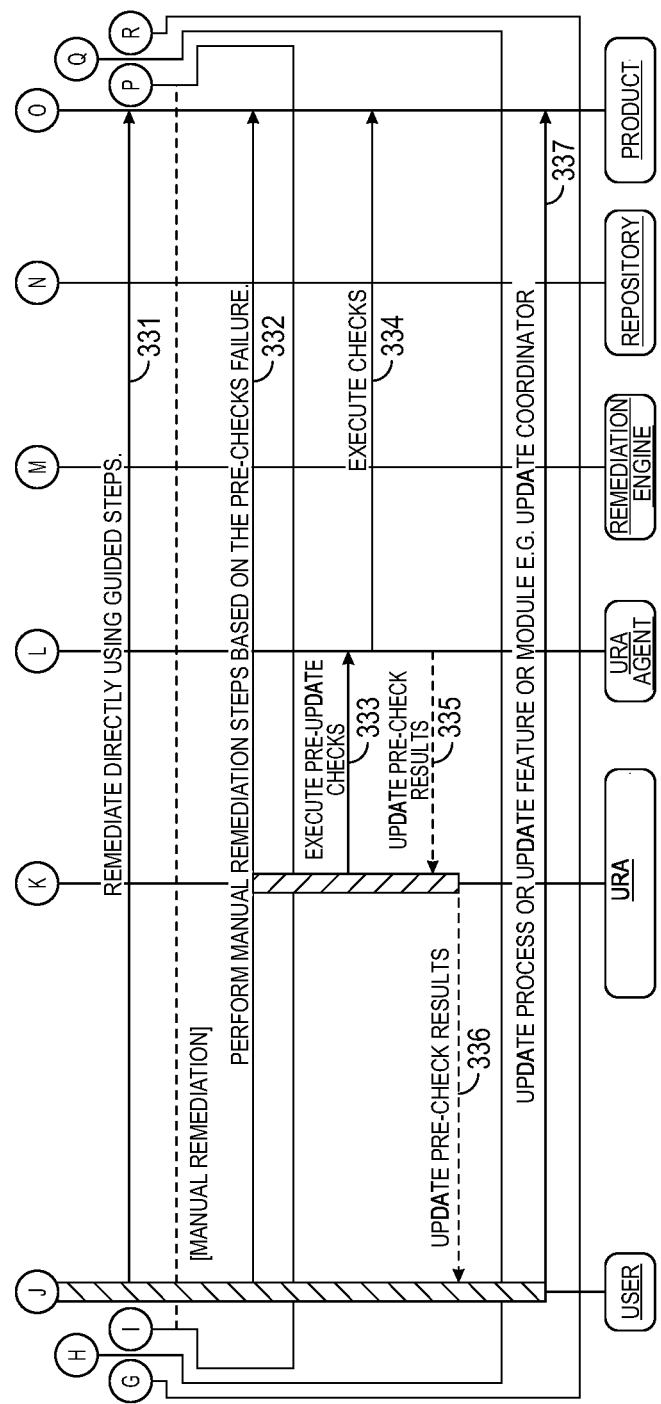

FIGS. 3A-3C depict an example of a call flow diagram 300 depicting steps performed by the various components or entities of the networking environment 100 of FIG. 1 for verifying pre-update readiness according to embodiments of the present disclosure.

The call flow diagram 300 includes communications between a user 356 (for example, of the user device 150) of a software product 352 (similar to the software product 152), and a URA 342 (similar to the URA 142 of FIG. 1). The URA 342 comprises a URA agent 343 (similar to the URA agent 143) and a repository 344 (similar to the repository 144) and employs a remediation engine 348. The call flow diagram 300 starts with a communication between the user 356 and the URA 342 with which the user 356 registers the software product 352 with the URA 342, at step 301. In some embodiments, the remediation engine 348 is integrated into one or more of the URA agent 343 and/or the corresponding URA agent of the software product 352. The remediation engine 348 may enable the URA agent 343 and/or the corresponding URA agent of the software product 352 to perform one or more remediation measures to cure the failed requirement.

In some embodiments, the repository 344 may correspond to a local repository that is managed by the user 356; this local repository may be separate from a central repository that is managed by the developer or URA administrator 456, introduced below. In some embodiments, the user 356 may populate the local repository with one or more of an update matrix, pre- and post-update modules, and remediation modules associated with software products 352 managed by the user 356 or relevant to the user 356.

In some embodiments, the developer may create and maintain the central repository. The central repository may be used to store aspects related to the URA 342 created by the developer. The developer may create the URA 342 and corresponding pre- and post-update and remediation modules for the URA for storage in the central repository. The developer may also collect the pre- and post-update modules and remediation modules developed by other developers or users 356 and store such modules in the central repository. The developer may also edit or enable editing of existing pre- and post-update modules and remediation modules in the central repository. As described in further detail below, the developer may check, certify, and publish the modules developed or edited by the developer, by third-party developers, by the users 356, and the like.

The user 356 may create and maintain the repository 344, which is deployed in an update operation environment, such as part of a system managed by the user 356 and for which the user wishes to identify update readiness. As introduced below, the user 356 may develop new pre- and post-update modules and remediation modules, edit existing pre- and post-update and remediation modules from the repository 344 or the central repository, and so forth. In some embodiments, the user 356 may check, certify and publish the new and modified modules developed by the user 356 before storing the new and edited modules to the repository 344. In certain embodiments, the user 356 may submit the new and modified modules developed by the user 356 to the central repository or use the central repository as a source for new and modified modules. In some embodiments, one or more access permissions exist between exchanging modules and the like between the user 356 and the repository 344 and the developer and the central repository. For example, the user 356 may check with the developer or directly access the central repository, assuming the user 356 is granted access to the central repository, to new and/or updated modules. If the user 356 is able to access new and/or update module sin the central repository, the user 356 may obtain get the new and/or updated modules from the central repository and push it to the local repository.

At step 302, the URA 342 registers the software product 352 with the URA 342. These communications may be similar to the registration of the software product 252 with the URA 242, introduced above. For example, the registration at step 302 may include details of the software product 352, such as the name and version identifier. In some instances, the registering of the software product 352 may include communication of details used for establishing communications between the software product 352 and the URA 342.

Following step 302, at step 303, the URA agent 343 may install (or cause to be installed) a corresponding URA agent (for example, corresponding to the URA agent 254) on the user device running the software product 352 such that the corresponding URA agent is associated with the software product 352. The URA agent 343 may further establish a channel or connection between the URA agent 343 and the corresponding URA agent associated with the software product 352. As noted above, the corresponding URA agent associated with the software product 352 may be installed at the corresponding user device.

At step 304, the URA agent 343 may provide an acknowledgement of completion of the registration of the software product 352 with the URA 342 and the installation of the corresponding URA agent at the software product 352. Thus, the software product 352 and the URA 342 (and the URA agent 343) will be connected, as shown at block 305.

At step 306, the user 356 may upload or provide one or more of a new or revised update matrix, pre- and post-update modules, and remediation modules associated with the software product 352 to the URA 342. For example, the user 356 may populate the repository 344 with the new or revised update matrices, pre- and post-update modules, and remediation modules described herein that may have been created or revised since the URA 342 was originally created and the repository 344 was originally populated. For instance, the user 356 may confirm with the developer about the availability of new or revised update matrices or modules (standard or custom). When any new or revised matrices or modules are available, the user 356 may obtain them from the developer (for example, a developer data store or from the central repository managed by the developer) and add the obtained new or revised matrices or modules to the repository 344. In some embodiments, the repository 344 is automatically updated where the URA 342 has access to the central repository of the developer.

In some other embodiments, the uploading or providing of the one or more of an update matrix, pre- and post-update modules, and remediation modules associated with the software product 352 to the URA 342 is performed by another user, such as the developer that created and/or approved the new or revised update matrices, pre- and post-update modules, and remediation modules.

In some embodiments, when uploading or providing one or more of the new or revised update matrix, pre- and post-update modules, and remediation modules, the user 356 may further include details or associations between modules or the like, such as particular orders for checks in one or more of the pre- and post-update modules and/or remediation modules. In some embodiments, limitations of the modules may be included in the respective modules. In some embodiments, at step 306, the user 356 provides customized pre- and/or post-update modules, or scripts to be included in one or more existing standard or customized pre- and/or post-update modules. Similarly, the user 356 may provide customized remediation measures for one or more standard or customized remediation modules.

At step 307, the URA 342 may store the information received from the user 356 at step 306 to the repository 344 for storage and access as needed or appropriate. The successful storage of the information received from the user 356 to the repository 344 at step 307 may be indicated and/or acknowledged, for example, at step 308.

At step 309, the URA 342 may provide an update matrix associated with the software product 352 and found in the repository 344 to the user 356. In some embodiments, at step 309, the user 356 may obtain the update matrix through the software product 352 such that the update matrix is associated with the software product 352 to be updated.

At step 310, the user 356 may provide the URA 342 with a selection or indication to update the software product 352. In some embodiments, the user also provides the URA 342 with identification of the target software or version for the update at step 310.

At step 311, based on the receipt of the user 356 selection to update the software product 352, the URA 342 may request pre-update modules associated with the software product 352 and the identified target software update from the repository 344. The request for the pre-update modules may include identification of the current name and version of the software product 352 and of the target name and version of the software product 352 to enable identification of relevant pre-update modules. In some embodiments, the request may further include post-update modules associated with the software product 352 and the identified target update.

At step 312, the repository 344 may convey the pre-update modules for the identified update to the URA 342, which then conveys the pre-update modules to the user 356 at step 313. In some embodiments, where the request at step 311 includes the request for the post-update modules associated with the selected update, the repository 344 may convey the post-update modules for the identified update to the URA 342, which further conveys the post-update modules to the user 356 at step 313.

At step 314, the user 356 may execute the requirement checks of the pre-update module via a communication to the URA 342. This may comprise executing the checks in a particular order or arrangement identified by the pre-update module or identified in the execution from the user 356. Such, the order or arrangement may control how the checks are completed. In some aspects, the checks may be prioritized into different categories. For example, some checks may be categorized as having a higher priority (e.g., critical) as compared to other checks (e.g., not critical). In some aspects, only certain priority of checks may be executed in certain conditions. In some aspects, performing the requirement checks may have a time limit, checks are performed until the time limit (such as in order of arrangement). In some aspects, critical checks may be performed regardless of the time limit.

At step 315, the URA 342 may then execute the pre-update requirement checks using the URA agent 343. Thus, as described above, the URA agent 343 may perform the requirement checks of the pre-update module for the update to the software product 352 at step 316.

At step 317, the URA agent 343 may provide the URA 342 with results from the pre-update requirement checks of the pre-update module, which then communicates the results to the user 356 at step 318. The results from the pre-update modules may comprise confirmation of requirements being met or failed requirement checks, and the like.

At step 319, if the pre-update module requirement check results are positive (indicating that all requirement checks are met or successful), then the software product 352 may be updated as requested by the user 356.

At step 320, if not all pre-update module requirement check results are positive (for example, one or more requirement checks of the pre-update module requirement checks fail), automated remediation measures may be employed. For example, the user 356 may request that the URA 342 remediate the failed requirement(s). In some embodiments, the user 356 may activate or select automated remediation, for example, before, during, or after the pre-checks are executed. Accordingly, if remediation is necessary following the pre-checks, no additional intervention from the user 356 is needed to complete the remediation. The URA 342, via the URA agent 343, may employ the remediation engine 348 to cure the failed requirements. More specifically, the remediation engine 348 may perform any automated remediation measures associated with any remediation modules to cure the failed requirement check(s).

At step 321, the remediation engine 348 may identify the remediation modules that can cure the failures of the pre-update module. Alternatively, the remediation engine 348 may provide identification of the failed requirement checks for the repository 344 to identify the appropriate remediation modules. As introduced above, the remediation module may be associated with a specific failed requirement check and/or the specific software product 352.

At step 322, the repository 344 may return the remediation module and the corresponding scripts to the remediation engine 348. For example, when the failed requirement relates to a password expiration date, the remediation engine 348 may employ a remediation module that enables the extension of the password expiration date. Thus, at step 323, the remediation engine 348 may execute the remediation module and any corresponding scripts on the software product 352 and/or the user device executing the software product 352.

At step 324, the remediation engine 348 indicates to the URA 342 whether the remediation was successful or not. At step 325, the URA 342 provides a similar reporting of whether the remediation was successful or not to the user 356. In some instances, a determination whether the remediation was successful or not is based on re-executing or applying the pre-update module and obtaining the results (for example, whether the requirement check results are positive) of the pre-update module, for example, at step 314-318 above. If the remediation is successful at curing the failed requirement, then the software product 352 may be updated, similar to step 319 above.

At step 326, if not all pre-update module requirement checks are successful at either step 318 or 324/325, the semi-automated (or guided instructions) remediation measures may be employed. For example, the user 356 may request that the URA 342 remediate the failed requirement check(s). In some embodiments, the user 356 may activate or select the semi-automated remediation, for example, before, during, or after the pre-checks are executed. Accordingly, if remediation is necessary following the pre-checks, the user 356 may perform guided instructions as needed to complete the remediation, as described below. The URA 342, via the URA agent 343, may employ the remediation engine 348 to cure the failed requirement checks. More specifically, the remediation engine 348 may perform any semi-autonomous or guided instruction remediation measures associated with any remediation modules to cure the failed requirement check(s).

At step 327, the remediation engine 348 may identify the semi-autonomous or guided instruction remediation modules to cure the failures of the pre-update module. As introduced above, the remediation module may be associated with a specific failed requirement and/or the specific software product 352.

At step 328, the repository 344 may return the semi-autonomous and/or guided instruction remediation module(s) and the corresponding scripts to the remediation engine 348.

At step 329, the remediation engine 348 may enable the URA agent 343 and/or the URA agent of the software product 352 to execute and/or provide the semi-autonomous or guided instructions to the user 356. Thus, at step 330, the URA 342 may provide the user 356 with the guided instructions for curing the failed requirement check(s).

At step 331, the user 356 may use the guided instructions from the URA 342 to cure the failed requirement check(s). Though not shown explicitly, one or more components of the call flow diagram 300 may determine whether the semi-autonomous or guided instruction remediation was successful or not. In some instances, the determination whether the remediation was successful or not is based on re-applying the pre-update module and obtaining the results of the pre-update module, for example, at step 314-318 above. If the remediation is successful at curing the failed requirement, then the software product 352 may be updated, similar to step 319 above.

At step 332, if not all pre-update module requirement checks are successful at either step 318 or 324/325, and/or following step 331, the manual remediation measures may be employed. For example, the user 356 may perform manual remediation steps based on the failed requirement(s). In some embodiment, at or before step 331, the user 356 may receive an indication from the URA 342 that the user's intervention is required.

At step 333, the URA 342 may execute the pre-update module requirement checks using the URA agent 343, similar to at step 315 above. Thus, the URA agent 343 may perform the checks of the pre-update module for the update to the software product 352 at step 334.

At step 335, the URA agent 343 may provide the URA 342 with the results from the pre-update module requirement checks, which then communicates the results to the user 356 at step 336. The results from the pre-update modules may comprise confirmation of requirements being met or failed requirements, and the like.

At step 337, if the pre-check results are all successful, then the software product 352 may be updated as requested by the user 356, similar to at step 319 above.

In some embodiments, instead of sequencing through the autonomous, semi-autonomous, and manual remediation module types, the URA 342 may select any one of the remediation module types based on input from the user 356 and/or the type of pre-update module requirement check that fails.

Furthermore, though the call flow diagram 300 primarily shows steps associated with the pre-update module requirement checks, similar steps as the call flow diagram 300 may be performed for post-update module requirement checks, where completion of the update of the software product 352 is only provided once the pre- and post-update module requirement checks are positive and/or successful.

Figure 4:
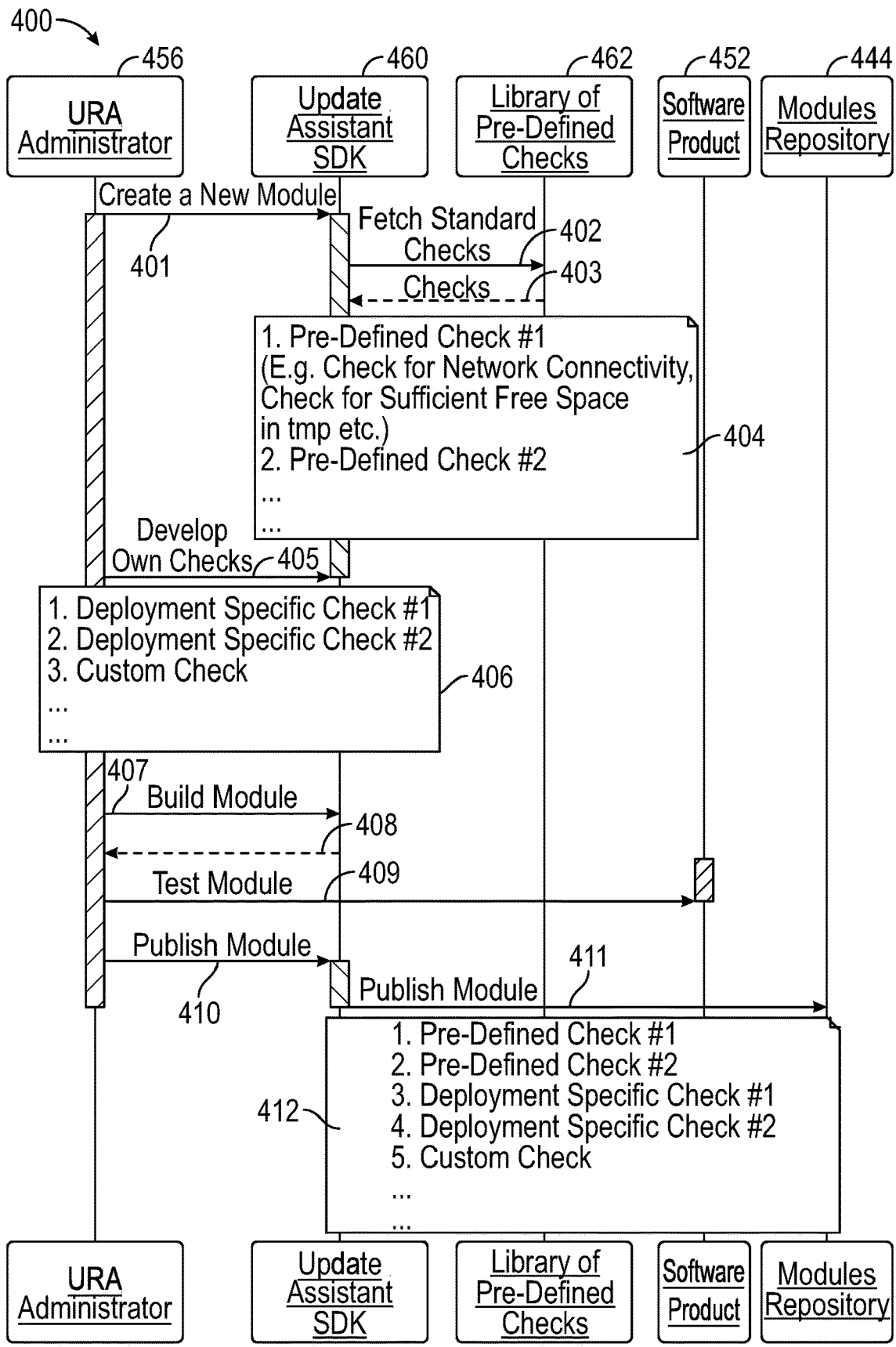
FIG. 4 depicts an example of call flows between the various components of FIG. 1 for publishing user-defined assessments integrated into the update readiness verification according to embodiments of the present disclosure.

FIG. 4 depicts an example of a call flow diagram 400 depicting steps performed by the various components or entities of the networking environment 100 of FIG. 1 for publishing user-defined assessments integrated into the update readiness verification according to embodiments of the present disclosure. For example, the call flow diagram 400 shows communications for enabling a user 456, which may represent the developer or the administrator of a URA, such as the URA of FIG. 2, to create, test, and publish one or more of: a new or custom pre- and/or post-update requirement check for an existing pre- and/or post-update module, respectively, a new or custom pre- and/or post-update module with new pre- and/or post-update requirement check(s), respectively, and/or new or custom remediation measures and/or modules. As shown in the diagram 400, the user 456 is creating a new pre- and/or post-update module using predefined pre- and/or post-update requirement checks and newly developed pre- and/or post-update requirement checks.

At step 401, the user 456 creates a new module using an update assistant software development kit (SDK) 460. This newly created module may comprise one or more of a pre-update module and/or a post-update module. The SDK 460 may actually create the new module frame and/or structure based on the request from the user 456 at step 401.

At step 402, the SDK 460 may fetch one or more standard checks from a library 462 of predefined checks. In some embodiments, the library 462 is part of the repository 444. In some embodiments, the library 462 is a separate data store from the repository 444. In some instances, the SDK 460 may request specific standard checks or request standard checks that are associated with a particular condition, and so forth.

At step 403, the library 462 returns the requested checks to the SDK 460. In some embodiments, example checks returned by the library 462 to the SDK 460 are shown at step 404.

At step 405, the user 456 creates custom checks. In some embodiments, the created custom checks may be specific to a particular deployment of a software product. For example, the deployment of the software product may utilize particular hardware or be customized for a particular instance. As introduced above, the user 456 may utilize customized pre- and/or post-update requirement checks to verify particular information or requirements. Examples of such custom checks are provided at step 406.

At step 407, the user 456 instructs the SDK 460 to build the pre- and/or post-update module based on the requested standard checks shown at step 404 and the developed custom checks shown at step 406.

At step 408, the SDK 460 may return the pre- and/or post-update module created based on the standard checks at step 404 and the custom checks at step 406 to the user 456.

At step 409, the user 456 may test the pre- and/or post-update module with the software product 452. For example, the user 456 may apply the pre- and/or post-update module in a simulated update of the software product 452. The user 456 may use such testing to ensure that the custom module returns the desired results and/or checks the desired requirements for the software product 452.

At step 410, where the test of the pre- and/or post-update module is successful (for example, provides the desired results with respect to the checks integrated into the pre- and/or post-update module), the user 456 may request that the SDK 460 publish pre- and/or post-update module.

At step 411, the SDK 460 publishes the pre- and/or post-update module in the repository 444 so that the custom module is accessible by the URA when updating the software product 452. An example of the standard and custom checks included in the custom module is shown at step 412.

Though not shown here, a similar process can be used to create remediation modules, where the user 456 and/or the software product 452 or corresponding user device may utilize custom remediation measures and/or a combination of standard and custom remediation measures.

In some embodiments, the user (such as the user 356) may create one or more of: a new or custom pre- and/or post-update requirement check for an existing pre- and/or post-update module, respectively, a new or custom pre- and/or post-update module with new pre- and/or post-update requirement check(s), respectively, and/or new or custom remediation measures and/or modules. Specifically, the user 356 may perform steps 401-408 to create the new or custom check or module, while the user 456 performs steps 409-412 to test and publish the check or module created by the user 356.

Figure 5:
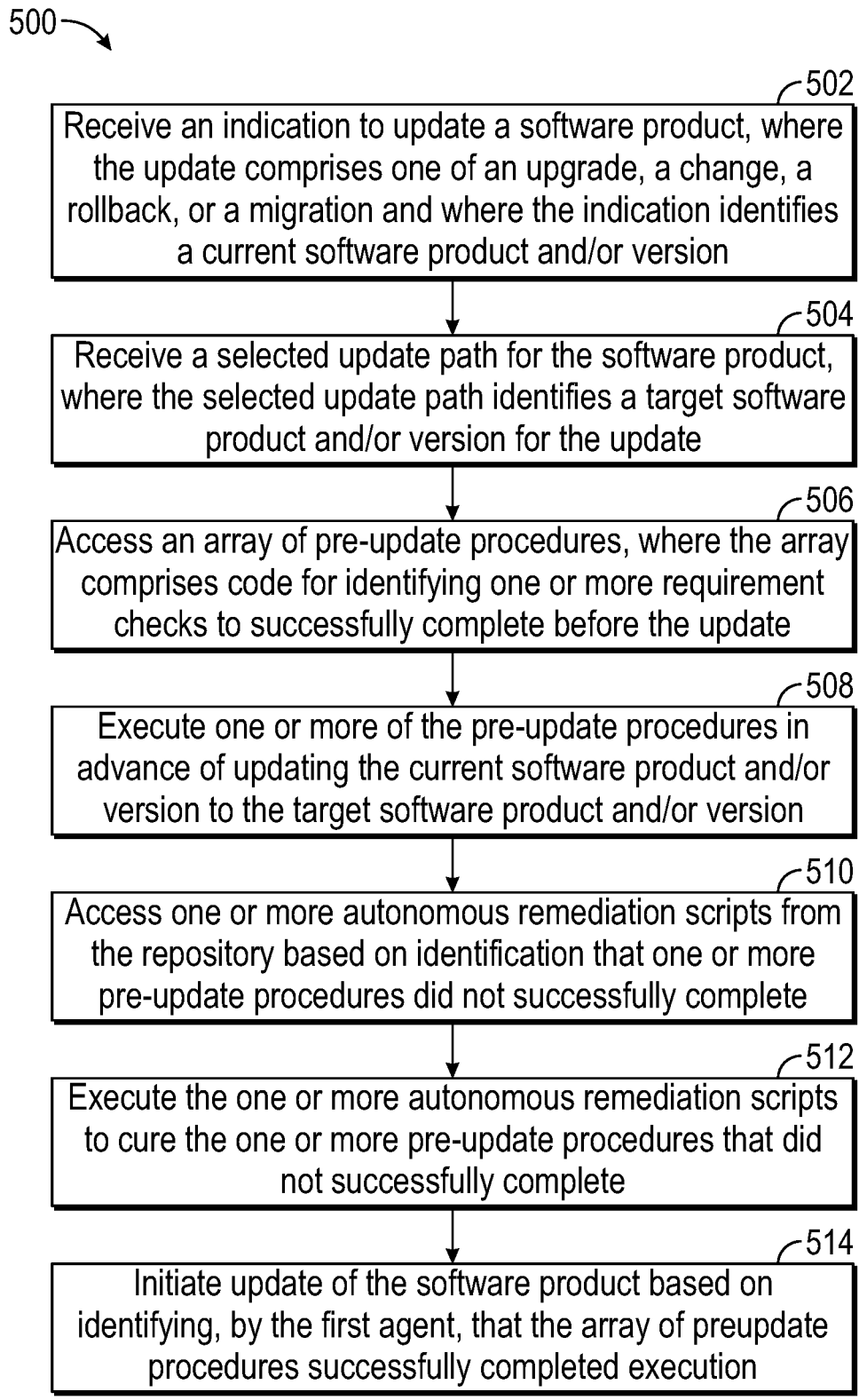
FIG. 5 depicts additional example operations for employing an update readiness framework according to embodiments of the present disclosure.

FIG. 5 depicts example operations 500 for employing an update readiness framework according to embodiments of the present disclosure. For example, operations 500 may be performed by one or more components of the URA (for example, the URA 142 of FIG. 1) as part of steps/blocks 302-305, 307-309, 311-313, 315-331 and/or 333-337 of FIG. 3C.

At block 502, the one or more components of the URA may receive an indication to update a software product, where the indication identifies a current software product and/or version. In some embodiments, the URA agent of the URA receives the indication.

At block 504, the one or more components of the URA may receive a selected update path for the software product, where the selected update path identifies a target software product and/or version for the update. The URA agent of the URA may receive the selected update path.

At block 506, the URA agent may access an array of pre-update procedures, for example, in the repository (corresponding to the repository 144) of the URA agent. The array may comprises code for one or more modules that identify one or more requirement checks to complete successfully before the update is initiated or completed. An example of the code for the one or more modules can be found in the pseudocode of FIG. 6.

At block 508, the URA agent or a URA agent installed on the software product (corresponding to the URA agent 154) executes one or more of the pre-update procedures (corresponding to executing the code from the array) in advance of updating the current software product and/or version to the target software product and/or version. The execution of the pre-update procedures may comprise identifying that the executed pre-update procedures are successfully completed (for example, that the corresponding requirement check is successful) or not.

At block 510, the URA agent accesses one or more autonomous remediation scripts from the repository based on identification that one or more of the pre-update procedures did not successfully complete (in other words, that at least one of the corresponding requirement checks failed or was not successful). In some embodiments, the URA agent accesses one or more semi-automated, guided remediation or manual remediation scripts in addition to or instead of the one or more autonomous remediation scripts, for example, where the autonomous remediation scripts are unable to cure the failed completion of the one or more of the pre-update procedures.

At block 512, the URA agent or the URA agent installed on the software product executes the one or more autonomous remediation scripts. These scripts may include code and/or instructions that enable the URA agent or the URA agent installed on the software product to fix or cure the conditions that resulted in the pre-update procedure failing or not completing successfully.

At block 514, the URA agent and/or the URA agent installed on the software product enables an update process (for example, corresponding to the update process 202) to perform the update of the software product to the target software product and/or version based on successful completion of the array of pre-update procedures.

Though not shown in FIG. 5, similar operations can be performed to complete an array of post-update procedures after the update to the target software product to determine successful completion of the update to the target software product. For example, after the update to the target software product is initiated at block 514, the operations for post-update procedures may include accessing the array of post-update procedures, where the array comprises code for identifying one or more requirement checks to successfully complete after the update is completed. The operations for the post-update procedures may further include executing one or more of the post-update procedures before confirming the update to the target software product is successful. Based on the execution of the one or more post-update procedures, the operations for the post-update procedures may also include accessing and executing one or more autonomous, semi-autonomous, or manual remediation scripts where one or more of the post-update procedures did not successfully complete.

FIG. 6 depicts pseudocode for a sample module descriptor file.

At pseudocode section 602, the pseudocode includes details regarding the descriptor file. Such details, as shown, include a name of the software product (for example, Software A), a type of module the pseudocode is for (for example, a pre- and/or post-update module, a remediation module, and so forth), a listing of one or more supported current versions for the software product, and a listing of one or more target versions for the software product with which the pseudocode works. Additional or fewer details can be included in the pseudocode section 602.

At pseudocode section 604, the pseudocode 600 includes details for requirement checks that are performed using the module depicted by the pseudocode 600. For example, the pseudocode section 604 includes the following fields or information:

a requirement check identifier that identifies each of the requirement check(s) described in the pseudocode section 604 (for example, may be used to call the corresponding specific requirement check using the module described in the pseudocode 600, a name for each of the requirement check(s) described in the pseudocode section 604, a description for each of the requirement check(s) described in the pseudocode section 604, and a component type for each of the requirement check(s) described in the pseudocode section 604.

The pseudocode 600 also includes a pseudocode section 606 that includes details for additional requirement checks that are performed using the module depicted. In addition to the fields or information identified above for the requirement checks in the pseudocode section 604, the pseudocode section 606 describes the additional requirement checks including a source for each additional requirement check.

In some embodiments, the requirement checks described in the pseudocode section 604 correspond to standard requirement checks while the additional requirement checks described in the pseudocode section 606 correspond to custom or user specific requirement checks.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and/or the like.

One or more embodiments of the present invention may be implemented as one or more computer programs or as one or more computer program modules embodied in one or more computer readable media. The term computer readable medium refers to any data storage device that can store data, which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to isolate completely the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to use only a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of updating a software component, comprising:
registering, with an update readiness system, a software product that is installed on a computing device by providing the update readiness system with a name of the software product and a version identifier of the software product; as a result of the registering, causing, by the update readiness system, an agent of the update readiness system to be installed on the computing device in association with the software product; receiving, by the update readiness system, an indication to upgrade the software product; receiving, by the update readiness system, a selected upgrade path for the software product, the selected upgrade path identifying a target for the software product; accessing, by the update readiness system, an array of pre-upgrade procedures from a repository based on the array being associated with the software product, the array of pre-upgrade procedures comprising code for identifying one or more conditions that must be met before the software product can be upgraded to the target; executing, by the update readiness system via the agent, one or more of the pre-upgrade procedures in advance of upgrading the software product to the target; accessing, by the update readiness system, one or more autonomous remediation scripts from the repository based on identification of one or more failed pre-upgrade procedures; executing, by the update readiness system via the agent, the one or more autonomous remediation scripts to cure the one or more failed pre-upgrade procedures; and initiating an upgrade of the software product to the target based on identifying, by the update readiness system, that the array of pre-upgrade procedures successfully completed execution.

2. The method of claim 1, further comprising:
determining that the executed one or more autonomous remediation scripts do not cure all of the one or more failed pre-upgrade procedures; and initiating a semi-autonomous remediation procedure based on the determination that the executed one or more autonomous remediation scripts does not cure all of the one or more failed pre-upgrade procedures.

3. The method of claim 2, wherein initiating the semi-autonomous remediation procedure comprises:
accessing one or more semi-autonomous remediation scripts from the repository; executing the one or more semi-autonomous remediation scripts; and determining whether the executed one or more semi-autonomous remediation scripts successfully caused the one or more failed pre-upgrade procedures to complete.

4. The method of claim 3, further comprising:
determining that the executed one or more semi-autonomous remediation scripts do not cure all of the one or more failed pre-upgrade procedures; instructing a user to execute one or more manual remediation steps; and determining whether the executed one or more manual remediation steps successfully caused completion of the one or more failed pre-upgrade procedures.

5. The method of claim 1, further comprising accessing an array of post-upgrade procedures from the repository, the array of post-upgrade procedures comprising corresponding code for identifying one or more conditions that must be met after the software product is upgraded to the target.

6. The method of claim 5, wherein at least one pre-upgrade procedure of the array of pre-upgrade procedures accessed from the repository comprises at least one procedure defined by a user to be completed before the upgrade initiates or at least one post-upgrade procedure of the array of post-upgrade procedures access from the repository comprises at least one procedure defined by the user to be completed after the upgrade completes.

7. The method of claim 5, wherein the array of pre-upgrade procedures accessed from the repository comprises an ordered arrangement of pre-upgrade procedures that controls an order in which the pre-upgrade procedures of the array of pre-upgrade procedures are to be successfully completed before the upgrade initiates or the array of post-upgrade procedures accessed from the repository comprises an ordered arrangement of post-upgrade procedures that controls an order in which the post-upgrade procedures are to be successfully completed after the upgrade completes.

8. The method of claim 1, wherein upgrading the software product to the target comprises migrating the software product to a new software product.

9. The method of claim 1, wherein upgrading the software product to the target comprises upgrading the software product from a first version to a second version of the software product.

10. A system, comprising one or more processors and a memory storing instructions that, when executed by the one or more processors, cause the system to perform a method of updating a software component, the method comprising:
registering, with an update readiness system, a software product that is installed on a computing device by providing the update readiness system with a name of the software product and a version identifier of the software product; as a result of the registering, causing, by the update readiness system, an agent of the update readiness system to be installed on the computing device in association with the software product; receiving, by the update readiness system, an indication to upgrade the software product; receiving, by the update readiness system, a selected upgrade path for the software product, the selected upgrade path identifying a target for the software product; accessing, by the update readiness system, an array of pre-upgrade procedures from a repository based on the array being associated with the software product, the array of pre-upgrade procedures comprising code for identifying one or more conditions that must be met before the software product can be upgraded to the target; executing, by the update readiness system via the agent, one or more of the pre-upgrade procedures in advance of upgrading the software product to the target; accessing, by the update readiness system, one or more autonomous remediation scripts from the repository based on identification of one or more failed pre-upgrade procedures; executing, by the update readiness system via the agent, the one or more autonomous remediation scripts to cure the one or more failed pre-upgrade procedures; and initiating an upgrade of the software product to the target based on identifying, by the update readiness system, that the array of pre-upgrade procedures successfully completed execution.

11. The system of claim 10, wherein the method further comprises: determining that the executed one or more autonomous remediation scripts do not cure all of the one or more failed pre-upgrade procedures; and initiating a semi-autonomous remediation procedure based on the determination that the executed one or more autonomous remediation scripts does not cure all of the one or more failed pre-upgrade procedures.

12. The system of claim 11, wherein initiating the semi-autonomous remediation procedure comprises:
accessing one or more semi-autonomous remediation scripts from the repository; executing the one or more semi-autonomous remediation scripts; and determining whether the executed one or more semi-autonomous remediation scripts successfully caused the one or more failed pre-upgrade procedures to complete.

13. The system of claim 12, wherein the method further comprises:
determining that the executed one or more semi-autonomous remediation scripts do not cure all of the one or more failed pre-upgrade procedures; instructing a user to execute one or more manual remediation steps; and determining whether the executed one or more manual remediation steps successfully caused completion of the one or more failed pre-upgrade procedures.

14. The system of claim 10, wherein the method further comprises accessing an array of post-upgrade procedures from the repository, the array of post-upgrade procedures comprising corresponding code for identifying one or more conditions that must be met after the software product is upgraded to the target.

15. The system of claim 14, wherein at least one pre-upgrade procedure of the array of pre-upgrade procedures accessed from the repository comprises at least one procedure defined by a user to be completed before the upgrade initiates or at least one post-upgrade procedure of the array of post-upgrade procedures access from the repository comprises at least one procedure defined by the user to be completed after the upgrade completes.

16. The system of claim 14, wherein the array of pre-upgrade procedures accessed from the repository comprises an ordered arrangement of pre-upgrade procedures that controls an order in which the pre-upgrade procedures of the array of pre-upgrade procedures are to be successfully completed before the upgrade initiates or the array of post-upgrade procedures accessed from the repository comprises an ordered arrangement of post-upgrade procedures that controls an order in which the post-upgrade procedures are to be successfully completed after the upgrade completes.

17. The system of claim 10, wherein upgrading the software product to the target comprises migrating the software product to a new software product.

18. The system of claim 10, wherein upgrading the software product to the target comprises upgrading the software product from a first version to a second version of the software product.

19. A non-transitory computer-readable medium comprising instructions that, when executed by one or more processors of a computing system, cause the computing system to perform a method of updating a software component, the method comprising:

registering, with an update readiness system, a software product that is installed on a computing device by providing the update readiness system with a name of the software product and a version identifier of the software product; as a result of the registering, causing, by the update readiness system, an agent of the update readiness system to be installed on the computing device in association with the software product; receiving, by the update readiness system, an indication to upgrade the software product; receiving, by the update readiness system, a selected upgrade path for the software product, the selected upgrade path identifying a target for the software product; accessing, by the update readiness system, an array of pre-upgrade procedures from a repository based on the array being associated with the software product, the array of pre-upgrade procedures comprising code for identifying one or more conditions that must be met before the software product can be upgraded to the target; executing, by the update readiness system via the agent, one or more of the pre-upgrade procedures in advance of upgrading the software product to the target; accessing, by the update readiness system, one or more autonomous remediation scripts from the repository based on identification of one or more failed pre-upgrade procedures; executing, by the update readiness system via the agent, the one or more autonomous remediation scripts to cure the one or more failed pre-upgrade procedures; and initiating an upgrade of the software product to the target based on identifying, by the update readiness system, that the array of pre-upgrade procedures successfully completed execution.

* * * * *